United States Patent [19]

Albagnac

[11] Patent Number: 4,824,124
[45] Date of Patent: Apr. 25, 1989

[54] ROTARY AND SEALED CONNECTION FOR PRESSURIZED FLUIDS

[75] Inventor: René D. M. Albagnac, Paris, France

[73] Assignee: S.A.T. (Societe Anonyme de Telecommunications), Paris, France

[21] Appl. No.: 112,379

[22] Filed: Oct. 22, 1987

[30] Foreign Application Priority Data

Oct. 22, 1986 [FR] France ................................ 86 14663

[51] Int. Cl.⁴ .......................... F16J 15/00; F16L 27/00
[52] U.S. Cl. .................................. 277/188 R; 285/276
[58] Field of Search ............... 285/276, 139, 175, 135; 277/188 A, 169, 188 R

[56] References Cited

U.S. PATENT DOCUMENTS

| | | | |
|---|---|---|---|
| 2,973,978 | 3/1961 | Oppenheim | 277/188 A |
| 3,088,759 | 5/1963 | Corsette | 277/188 A X |
| 3,957,294 | 5/1976 | Hoban et al. | 285/276 |
| 4,478,438 | 10/1984 | Elorriaga | 285/276 |
| 4,561,681 | 12/1985 | Lebsock | 285/276 |

FOREIGN PATENT DOCUMENTS

2207644 8/1973 Fed. Rep. of Germany.

*Primary Examiner*—Donald A. Griffin
*Attorney, Agent, or Firm*—Lowe, Price, LeBlanc, Becker & Shur

[57] ABSTRACT

A rotary and sealed connection for pressurized fluids is provided, including a first part that is secured, for example, to a fixed source of pressurized fluid and has a recess for communication therewith and through a second part, with a fluid-using rotary apparatus of revolution rotating about a shaft and extending through the first part through a passage, said second part having a degree of radial freedom and being held in position without play by a seal serving as a bearing. The annular space in the passage may thus be extremely reduced, thus avoiding any risk of extrusion of the seal.

20 Claims, 1 Drawing Sheet

U.S. Patent
Apr. 25, 1989
4,824,124
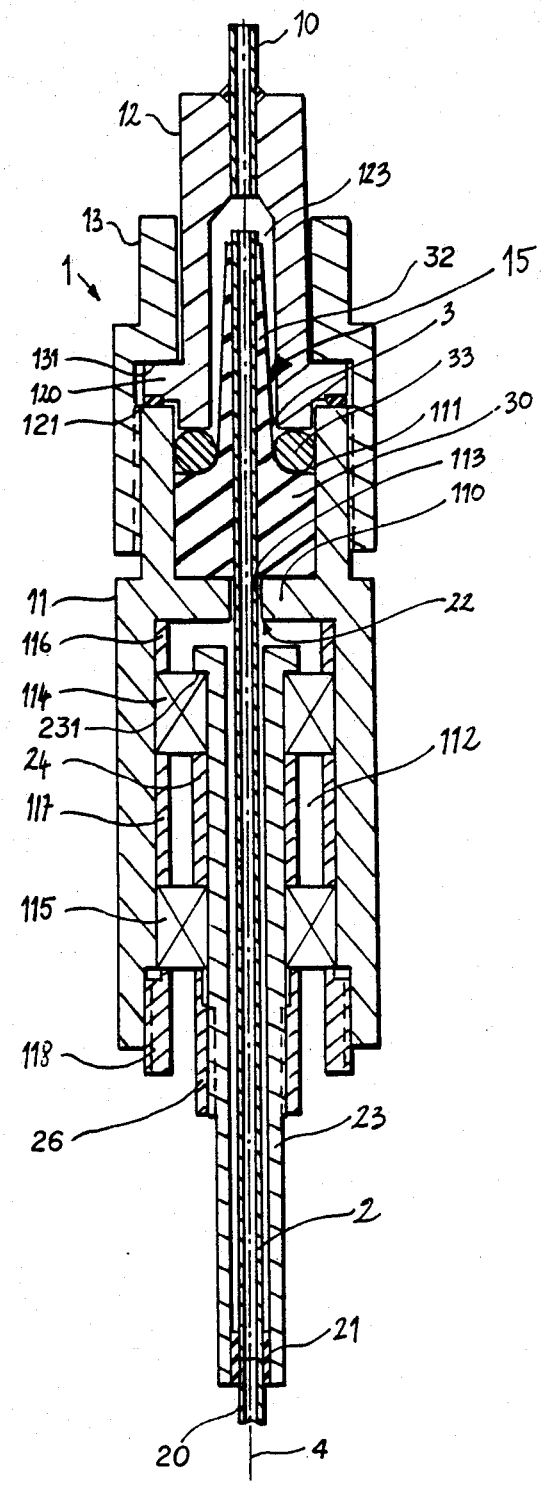

ROTARY AND SEALED CONNECTION FOR PRESSURIZED FLUIDS

BACKGROUND OF THE INVENTION

1. Field of the Invention

The present invention relates to a rotary and sealed connection for pressurized fluids, for connecting a first element, e.g., a pressurized fluid source, and a second element, such as an apparatus using said fluid, mounted for relative rotation about a shaft.

2. Description of the Prior Art

A pressurized rotatable sealed connection is often used for supplying a rotary platform with all kinds of fluids. For example, an infrared detection turret provided with a cooling system may be fed with a gaseous fluid, such as nitrogen, or argon, from a fixed reservoir through a connection of the above type.

A connection of the this type is already known, as described in the French application No. 2 538 875. In this connection, in order to obtain a good sealing without rapid wear of the seal and of the surface of the second part in contact with this seal, this latter is made from a relatively flexible and elastic material.

Furthermore, the width of the annular space between the second part and the passage cannot be less than a limit value depending in particular on the quality of the mechanical coupling making possible the relative rotation of the first and second parts.

Under these conditions, there is then a risk of extrusion of the relatively flexible seal into the annular space when the pressure difference on each side of the seal is very high, and to eliminate this risk a relatively rigid and anti-extrusion ring must be provided.

The presence of the anti-extrusion ring, which in particular requires the provision of means urging the annular part of the flexible seal against the second part, as well as an O seal, appreciably complicates the connection and the mounting and operation thereof.

SUMMARY OF THE INVENTION

The present invention aims at overcoming these drawbacks by providing a connection which requires no anti-extrusion seal, even for very high pressure differences on each side of the seal.

For this, in a preferred embodiment it provides a connection of the above defined type, which includes:

a first part, secured to said first element, having a recess for communication therewith and for receiving a flexible seal;

a second part, hollow and of revolution, secured for rotation to said second element, communicating therewith and with said recess, and extending through said first part through a passage forming an annular space about said second part;

said seal being provided with at least one annular part preventing flow of said pressurized fluid through said annular space;

said second part being mounted on said second element with a degree of radial freedom; and said seal serves as bearing for said second part and holding it without play in said passage.

In the connection of the invention, since there is no play between the second part and the passage, the annular space may be reduced to the minimum compatible with the absence of contact between the first part and the second part and the risk of extrusion is therefore suppressed. Thus, in order to eliminate the drawbacks related to the necessity of providing an anti-extrusion ring, the problem is solved by appreciably reducing the extrusion space of the seal.

Advantageously, said seal comprises a portion in the form of a sleeve, adjacent said annular part and disposed so that the inner surface of said sleeve is applied against the outer surface of said second part under the action of the pressure difference on each side of said seal.

Thus, the higher the pressure of the fluid, the better the sealing provided by the seal.

Again advantageously, said second part is a cylindrical tube, rigid in axial rotation and radially flexible, fixed to said second element at a distance from said passage which is large with respect to the diameter of said tube.

BRIEF DESCRIPTION OF THE DRAWING

The present invention will be better understood from the following description of the preferred embodiment of the connection of the invention, with reference to the accompanying drawing, in which the single FIGURE shows a sectional view of the connection of the invention.

DESCRIPTION OF THE PREFERRED EMBODIMENT

The rotary connection shown in the FIGURE makes it possible here to place a fluid source, not shown, in communication with an apparatus using this fluid, not shown either.

The fluid source for example, may be a reservoir containing nitrogen gas at a pressure substantially equal to $4.10^7$ Pascal.

The fluid-using apparatus may be a device for cooling an infrared detection system.

The reservoir in this embodiment is, for example, disposed on a fixed frame, not shown, whereas the detection system, and so the cooling device which is associated therewith, are mounted on a platform which can rotate with respect to the frame and is not shown either. Such an arrangement makes possible a 360° scan of the volume in which the infrared radiation is to be detected.

In the FIGURE can be seen at 10, in the upper part, a pipe for connection to the reservoir and, at 20, in the lower part, a pipe for connection to the cooling device.

The axis of rotation of the rotary platform, vertical in the FIGURE, is shown at 4.

Pipe 10 is secured to the fixed frame (not shown) and it is connected to a first part 1, also fixed to this frame by conventional means (not shown).

The first part 1, formed here with a symmetry of revolution, comprises a body 11 and a lid 12 assembled together by means of a clamping ring 13.

Body 11 has the general shape of a hollow circular cylinder with axis 4, whose inner volume is divided by a dividing wall 110 extending along a cross sectional plane, thus defining a first volume 111, the upper one in the FIGURE, and a second volume 112, the lower one in the FIGURE, each in the shape of a circular cylinder.

In dividing wall 110 is formed a passage 113, in the form of a circular cylinder with axis 4, placing the first volume 111 in communication with the second volume 112.

Lid 12 has the general shape of a hollow cylinder with axis 4, defining a third volume 123, communicating upwards with pipe 10 and open downwards. The lower part of lid 12 fits partially in the upper part of body 11. Lid 12 is provided with an annular external shoulder 120 which bears on the upper edge of body 11, from which it is separated by an annular seal 121 of known type. The clamping ring 13 has a setback 131 bearing on shoulder 120 and it is screwed on the upper external part of body 11, for clamping body 11 and lid 12 one against the other.

Pipe 20 is secured to a rotary plate (not shown) and it is connected to a second part, with symmetry of revolution about axis 4, in this case a tube 2, here made from metal, by a weld 21. Tube 2 is then secured for rotation about axis 4 with the rotary platform. Tube 2 extends along axis 4 through the body 11, first of all inside the second volume 112, then through the passage 113 which forms thereabout an annular space 22 and finally inside the first volume 111. Tube 2 here also extends inside the third volume 123 of lid 12, into which it opens. Tube 2, for example, is made from stainless steel and has a surface that is treated and polished and its external diameter may be of the order of 0.9 mm.

A flexible seal 3, here made from polytetrafluorethylene (P.T.F.E.) charged with graphite, comprises an annular part 30, the lower part in the FIGURE, over which is mounted an elongate cylindro-conical sleeve 32, of the same inner diameter provided for sealingly fitting about the part of tube 2 extending inside the first volume 111 and the third volume 123. An O-seal 33, of known type, is interposed between the lower part of lid 12 and the annular part 30 of seal 3, which is thus clamped against the dividing wall 110 when clamping ring 13 is screwed on body 11. In this condition, the annular part 30 is provided so as to have an outer diameter exactly matching the diameter of the first volume 111.

Thus, when body 11 and lid 12 are assembled together by means of the clamping means 13 body 11 is provided with a recess 15, including here the first volume 111 and the third volume 123, which communicates with pipe 10 through lid 12 and with pipe 20 through tube 2. Recess 15 also receives the seal 3.

The inner wall of body 11 which defines the second volume 112 is used for supporting two ball bearings 114 and 115, held in position by means of a known arrangement of spacers 116 and 117 and a clamping ring 118.

Bearings 114 and 115 make possible the rotation about axis 4 of a hollow shaft 23, to which they are fixed in a known way by means of a clamping ring 26 cooperating with the spacer 24 and a shoulder 231 on the hollow shaft 23.

The hollow shaft 23 has passing therethrough the tube 2 to which it is fixed by the weld 21. The hollow shaft 23 is secured to the rotary platform to which it is fixed by conventional means not shown. Weld 21 is formed outside the volume 112 and in any case at a distance from passage 113 which is large with respect to the diameter of the tube 2, that is to say at least equal to substantially five times this diameter.

The connection which has just been described operates as follows. The pressurized fluid, coming from the source through pipe 10, fills recess 15 which communicates with the fluid-using apparatus through tube 2 and pipe 20. The seal 3 prevents said fluid from flowing through the annular space 22, and all the more efficiently the higher the pressure of the fluid, for the pressure difference on each side of seal 3 applies the inner surface of sleeve 32 against the outer surface of tube 2, and the base surface of the annular part 30 against the dividing wall 110 of body 11.

Because tube 2 is here made from a material which is rigid in axial rotation, i.e., one which does not deform under the action of a torsional force about the axis 4 of tube 2 but is radially flexible so that it is relatively resilient when a force is applied perpendicular to axis 4, and because the weld 21 which fixes tube 2 on the hollow shaft 23 so on the rotary platform is at a distance from the passage 113 which is large with respect to the diameter of the tube, tube 2 is effectively mounted on the rotary platform with a degree of radial freedom. In other words, tube 2 may collapse inside the hollow shaft 23, with respect to the rotary platform.

Thus, at the level of passage 113, tube 2 would be radially free if it were not held in position by seal 3 which then plays the role of bearing therefor. Consequently, the play of tube 2 inside passage 113 is practically non-existent and the annular space 22 may have an extremely reduced value, thus avoiding any risk of extrusion of seal 3, even, as is the case, when this seal is chosen to be flexible so as to avoid premature wear.

It should be noted that the O-seal 33 serves essentially for holding seal 3 mechanically in position, and in particular for thus ensuring centering of tube 2 in passage 113. The role of the O-seal 33 with respect to sealing is secondary, such sealing being provided on the one hand by the flat fixed seal 121 and on the other by the pressure of the fluid itself which, considering the particular shape of seal 3, including the annular part 30 and sleeve 32, applies seal 3 against tube 2 and against the dividing wall 110, as has been explained.

Naturally, the invention is not limited to the description which has just been made. In particular, a person of ordinary skill in the art could think of other means than collapsing the tube 2 for conferring thereon a degree of radial freedom and, obviously, the connections of the source and the apparatus could be exchanged.

What is claimed is:

1. A rotary sealed connection for connecting a pressurized fluid source to an apparatus using said fluid and which is mounted for relative rotation about a shaft, comprising:

a first part, secured to said fluid source having a recess for communication therewith and for receiving a flexible seal;

a second part, hollow and of revolution, secured for rotation with said fluid-using apparatus, communicating therewith and with said recess and extending through said first part through a passage forming an annular space about said second part;

a flexible seal provided with at least one annular part preventing flow of said pressurized fluid through said annular space, said second part being mounted on said fluid-using apparatus with a degree of radial freedom and said seal serving as a bearing for said second part and holding it without play in said passage.

2. The connection as claimed in claim 1, wherein: said seal comprises a portion in the form of a sleeve, adjacent said annular portion and disposed so that the inner surface of said sleeve is applied against the outer surface of said second part under the action of a pressure difference across said seal.

3. The connection as claimed in claim 2, wherein: said second part is a cylindrical tube, rigid in torsion and radially flexible, fixed to said fluid-using apparatus at a distance from said passage which is large with respect to the diameter of said tube.

4. The connection as claimed in claim 3, wherein:
said seal is made from polytetrafluoroethylene charged with graphite.

5. The connection as claimed in claim 2, wherein:
said seal is made from polytetrafluoroethylene charged with graphite.

6. The connection as claimed in claim 2, wherein:
mechanical means are provided for clamping said annular portion of said seal against a dividing wall of said first part in which said passage is formed, and for ensuring centering of said tube in said passage.

7. The connection as claimed in claim 1, wherein:
said second part is a cylindrical tube, rigid in torsion and radially flexible, fixed to said fluid-using apparatus at a distance from said passage which is large with respect to the diameter of said tube.

8. The connection as claimed in claim 7, wherein:
said seal is made from polytetrafluoroethylene charged with graphite.

9. The connection as claimed in claim 1, wherein:
said seal is made from polytetrafluoroethylene charged with graphite.

10. The connection as claimed in claim 1, wherein:
mechanical means are provided for clamping said annular portion of said seal against a dividing wall of said first part in which said passage is formed, and for ensuring centering of said tube in said passage.

11. A rotary sealed connection for connecting a pressurized fluid source to an apparatus using said fluid and which is mounted for relative rotation about a shaft, comprising:
   a first part, secured for rotation with said fluid-using apparatus, having a recess for communication therewith and for receiving a flexible seal;
   a second part, hollow and of revolution, secured to said source, communicating therewith and with said recess and extending through said first part through a passage forming an annular space about said second part;
   a flexible seal provided with at least one annular part preventing flow of said pressurized fluid through said annular space, said second part being mounted on said source with a degree of radial freedom and said seal serving as a bearing for said second part and holding it without play in said passage.

12. The connection as claimed in claim 11, wherein:
said seal comprises a portion in the form of a sleeve, adjacent said annular portion and disposed so that the inner surface of said sleeve is applied against the outer surface of said second part under the action of the pressure difference across said seal.

13. The connection as claimed in claim 12, wherein:
said second part is a cylindrical tube that is torsionally rigid and radially flexible, fixed to said source at a distance from said passage which is large with respect to the diameter of said tube.

14. The connection as claimed in claim 13, wherein:
said seal is made from polytetrafluoroethylene charged with graphite.

15. The connection as claimed in claim 12, wherein:
said seal is made from polytetrafluoroethylene charged with graphite.

16. The connection as claimed in claim 12, wherein:
mechanical means are provided for clamping said annular portion of said seal against a dividing wall of said first part in which said passage is formed, and for ensuring centering of said tube in said passage.

17. The connection as claimed in claim 11, wherein:
said second part is a cylindrical tube that is torsionally rigid and radially flexible, fixed to said source at a distance from said passage which is large with respect to the diameter of said tube.

18. The connection as claimed in claim 17, wherein:
said seal is made from polytetrafluoroethylene charged with graphite.

19. The connection as claimed in claim 11, wherein:
said seal is made from polytetrafluoroethylene charged with graphite.

20. The connection as claimed in claim 11 wherein:
mechanical means are provided for clamping said annular portion of said seal against a dividing wall of said first part in which said passage is formed, and for ensuring centering of said tube in said passage.

* * * * *